Patented Nov. 16, 1948

2,453,972

UNITED STATES PATENT OFFICE 2,453,972

MACHINE FOR CUTTING AND POLISHING NONSPHERICAL OR CONICAL SURFACES BY MEANS OF ABRASIVE BAND TOOLS

Serge Clavé and Marcel Clavé, Paris, France

Application April 14, 1947, Serial No. 741,400
In France October 13, 1942

Section 1, Public Law 690, August 8, 1946
Patent expires October 13, 1962

8 Claims. (Cl. 51—62)

1

In our French Patent No. 835,191 of August 31, 1937, we have described a tool for cutting and polishing glass and metal parts, said tool having an active cylindrical surface of suitable dimensions, the cross sectional contour of which is such that the outer contour of an abrasive carrier associated therewith constitutes the contour which it is desired to impart to the part to be cut and polished, and wherein said abrasive carrier, comprising a constantly-taut band or belt is adapted to be relatively displaced with respect to the tool, while remaining applied in engagement with the active surface of the latter by means of suitable guiding means.

Our present invention has for its object to provide a machine especially adapted to make use of tools of the type described in said prior Patent No. 835,191 for the purpose of cutting or polishing non-spherical or conical surfaces, both concave or convex, said surfaces either being surfaces of revolution about an axis, or cylindrical surfaces or further torical surfaces.

The machine according to our invention comprises two principal parts namely:

1. A support for the work-piece and the feeding mechanism thereof which may be of various characters according to whether the surface is a surface of revolution or a cylindrical surface or a torical surface, said support being mounted on a vertically adjustable bracket on the main frame of the machine.

2. A support for the tool proper and the drive mechanism for the abrasive belt, this second portion of the machine remaining unchanged whatever may be the shape of the work-piece, and being mounted upon a sliding poppet on an horizontal slide block slidable on the main frame of the machine.

We may provide means either to immobilize the work-piece against rotation or to cause said work-piece to be rotated about an axis passing through the axis of symmetry of the tool, or further rotate the work-piece about an axis perpendicular to the axis of said tool.

Means are also provided to impart to the tool carrier a reciprocation perpendicular to the direction of displacement of the abrasive-carrying belt, with the purpose of compensating for the wear of said belt throughout its entire width.

Other objects and characteristics will appear from the following disclosure made in reference with the appended drawings which diagrammatically illustrate by way of example a machine constructed according to the invention and also show

2 modified embodiments relating to some details thereof.

Figure 1:
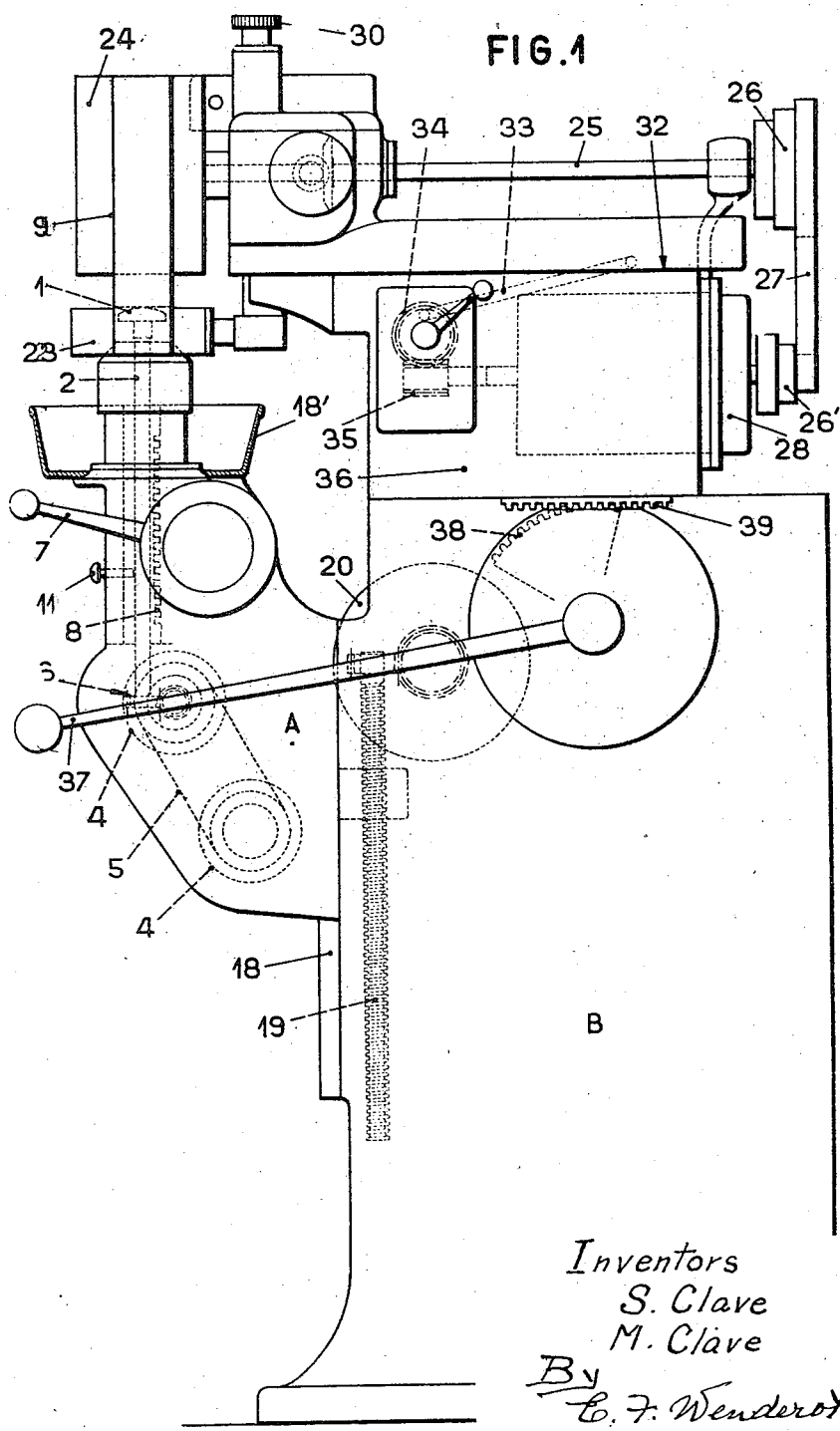
Figure 2:
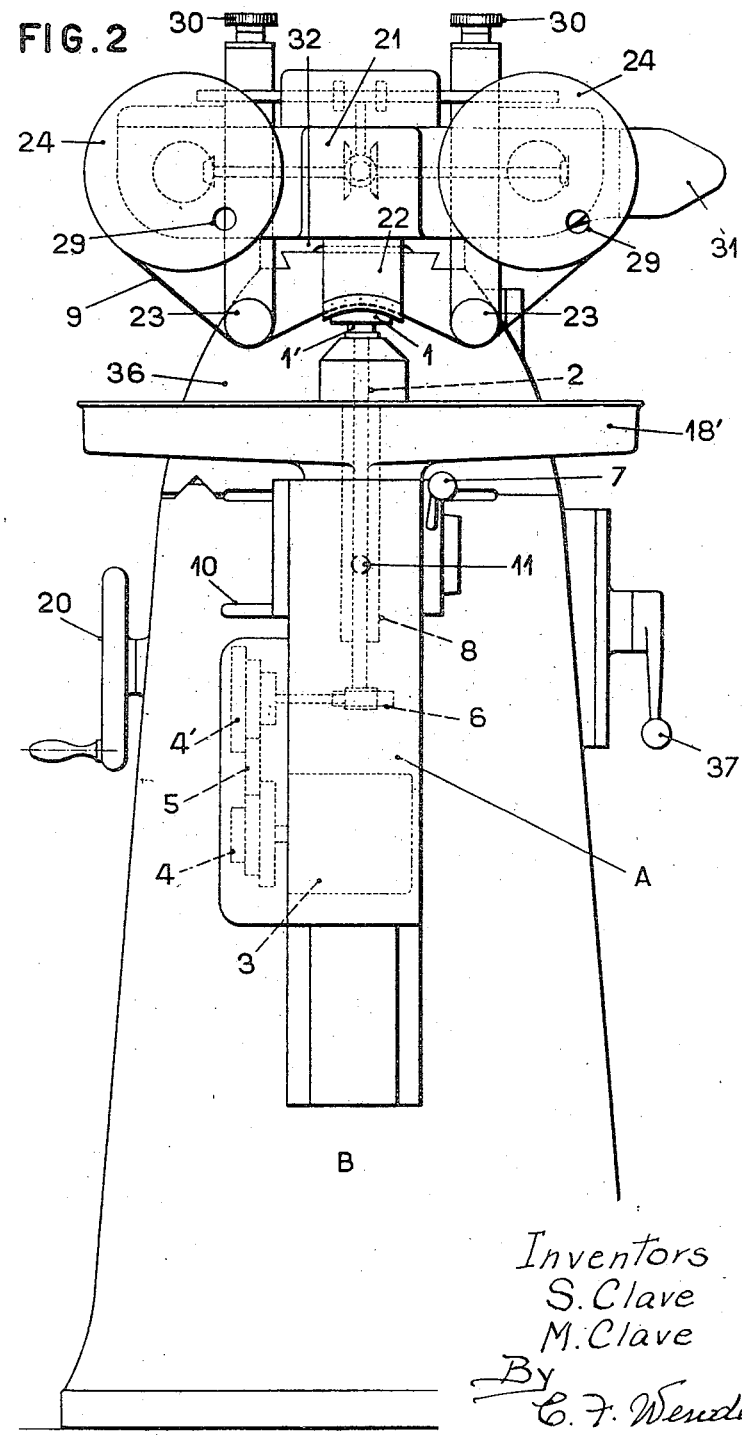
Figure 3:
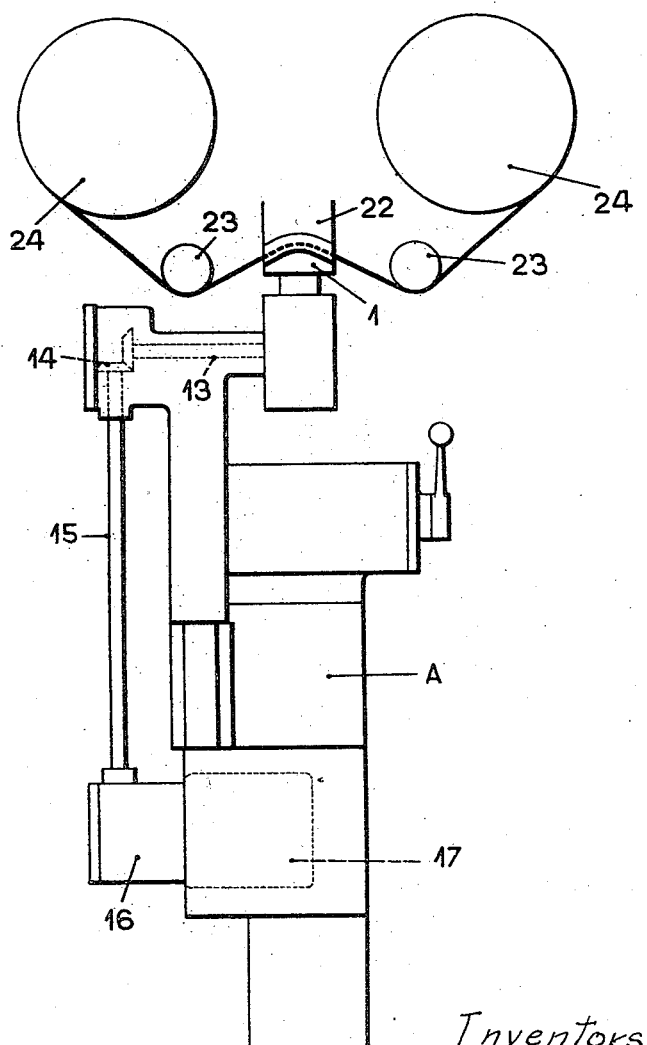
Figure 4:
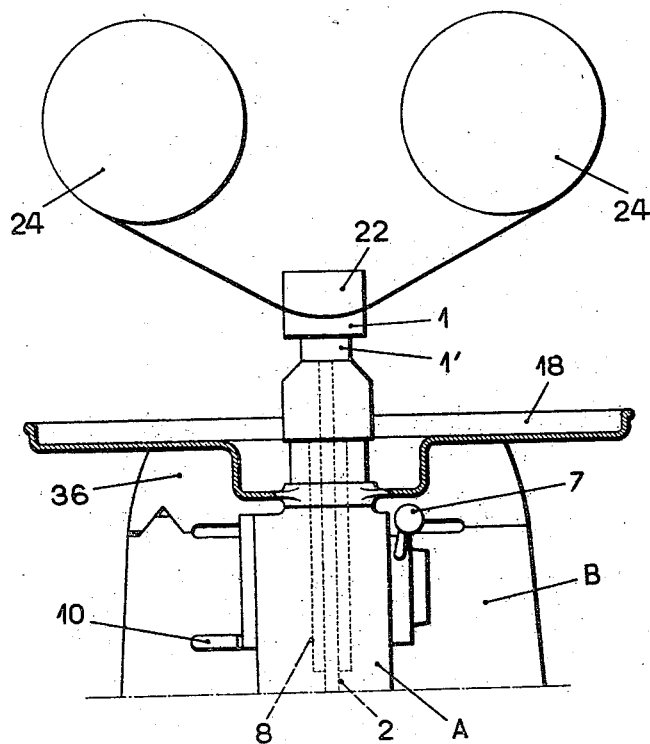

Fig. 1 is a side view of the machine.
Fig. 2 is a front view thereof.
Fig. 3 diagrammatically shows a mounting for the cutting of torical surfaces, and,
Fig. 4 diagrammatically shows a device for the cutting of concave surfaces.

As shown in Figs. 1 and 2 of the appended drawings, which are concerned with the cutting and polishing of a surface of revolution, the work-piece 1 is mounted in concentric relationship on a stud 1' in turn secured on a spindle 2 which is driven in rotation from a motor 3 through a transmisison means comprising stepped sheaves 4 and 4', a transmission belt 5 and a speed reducing worm gearing 6. The spindle 2 may be vertically reciprocated by a lever 7 which through a pinion controls a rack 8 rigid with said spindle for longitudinal movements therewith. Said reciprocation makes it possible to bring the work-piece 1 into engagement with the abrasive band 9 to be described later.

In automatic operation, a device formed for example by a coil spring provides for maintaining the work-piece 1 in permanent contact engagement with the abrasive band or belt 9 under a pre-determined pressure adapted to be varied by acting on the tension of the spring through a tightener means 10.

In the case of cylindrical surfaces, the spindle 2 is immobilized for rotation by means of a stop finger 11 engaging a recess formed in the spindle, and the work-piece 1 is then only movable in a vertical direction to engage the abrasive belt 9.

In the case of torical surfaces, the organization shown in Fig. 3 is used. As shown in this figure, the support for the work-piece 1 is mounted on a horizontally extending spindle 13 actuated through an angle gearing 14, a shaft 15 and a speed reducer 16 from a motor 17 (which herein replaces the motor 3 of the example shown in Figs. 1 and 2). The spindle 13 may also be made to reciprocate instead of being continuously rotated.

In all three events considered (i. e., cutting and polishing of a surface of revolution, a cylindrical surface and a torical surface) the assembly comprising the work-piece 1, the stud 1', the spindle 2, the trough 18' and all of the other above described elements is mounted upon a bracket A movable for vertical adjustment on a slide way 18 of the main frame B of the machine and operable through a worm 19 controlled from the exterior through appropriate transmissions, from a hand wheel 20.

The support for the tool and the mechanism for driving the abrasive band comprises a plate 21 on which is secured the actual tool 22. In the case of convex surfaces (Figs. 1 and 2) the band 9 is supported after emerging from the tool 22 on tensioning rollers 23; in the case of concave surfaces (Fig. 4) said tensioning rollers are omitted.

The abrasive band or belt 9 is at both ends thereof anchored to two drums 24 symmetrically disposed on both sides of the tool 22 and supported by the plate 21. Both drums 24 are simultaneously and synchronously actuated by means of a known type of mechanism comprising pinions driven through a spindle 25 controlled through the medium of stepped sheaves, 26, 26″ and a belt 27 from an electric motor 28.

Both rollers 24 have mounted thereon adjustable stops 29 adapted to limit the travel of the abrasive band 9 and which control in a known manner the reversal of the direction of operation, so that said abrasive band will effect a reciprocation in the longitudinal direction thereof.

The vertical level of the tensioning roller 23 is adjustable by means of screws 30 which each control a slide-block supporting said tensioning rollers. The tension in the abrasive band is maintained uniform by means of a suitable tightening device disposed at 31 and directly connected with the drums 24.

Moreover, we provide a take-up device for the drums 24 adapted to disclose a greater or smaller portion of the abrasive belt 9 as said belt is subjected to wear.

The tool-carrying assembly is mounted on a poppet 32, slidable on a slide-block 36 and reciprocated through a link 33 and an adjustable eccentric 34 controlled through a worm and worm gear connection 35 from the motor 28. The stroke of the poppet 32 may be increased or decreased and even altogether suppressed by increasing or decreasing or totally suppressing respectively the degree of eccentricity of the eccentric 34.

The carriage 36 which mounts the motor 28 is slidable on the main frame B of the machine and may be controlled by means of a lever 37 which through a toothed sector 38 actuates a rack member 39 rigid with said carriage. By operating the lever 37, the work-piece may be cleared for purposes of mounting, dismounting, control and cleaning.

It will, of course, be understood that the exemplary embodiment of the machine as described above and illustrated in the appended drawing is given in a purely indicative and not a restrictive sense and that our improved machine may be provided with any modification of detail without departing from the spirit of the invention or exceeding the scope thereof.

What we claim is:

1. Improved machine for the cutting and polishing of non-spherical surfaces of the type described, comprising in combination a main frame, a bracket movable for vertical reciprocation on said frame, means for vertically reciprocating said bracket, a workpiece support on said bracket, a movable tool-carrying and tool-driving means on said frame having a band-like abrasive tool thereon and a backing die therefor, means for moving said movable means between an active position in which said abrasive band tool may be placed in abrasive engagement with a workpiece on said workpiece support and an inactive position wherein said tool is clear of said workpiece, and means for imparting to said abrasive band both a longitudinal reciprocation and a lateral reciprocation.

2. Improved cutting and polishing machine of the type described comprising in combination a main frame, a bracket vertically slidable on said frame, a vertically extending rotatable work-supporting spindle on said bracket, a vertically-extending rack means in said bracket rigidly connected with said spindle for vertical movement only, a pinion means journalled on said frame for meshing engagement with said rack, manual actuating means rigid with said pinion whereby said work-supporting bracket may be manually reciprocated between a lower idle position and an upper working position, a movable tool-carrying and tool driving means on said frame having a band-like abrasive tool thereon, and a backing die therefor, means for moving said movable means between an active position wherein said abrasive band may be placed in abrasive engagement with a workpiece on said workpiece support in working position and an inactive position wherein said band is clear of said workpiece in said working position thereof and means for imparting to said abrasive band both a longitudinal and a lateral reciprocation.

3. An improved cutting and polishing machine of the type described comprising in combination a main frame, a bracket vertically slidable on said frame between a lowermost idle and an uppermost working position, a vertically extending work-supporting spindle rotatably mounted in said bracket, an electric motor in said bracket and transmission means for driving said spindle in rotation from said motor, a vertically extending rack member in said bracket rigidly connected with said spindle for vertical movement but not for rotation, a pinion journalled in said frame and meshing with said rack, manual actuating means for rotating said pinion, a movable tool-carrying means on said frame, a band-like abrasive tool thereon and a backing die for said band, means for moving said movable means between an active and an inactive position on said frame with respect to said work-supporting spindle and means for imparting to said abrasive band concurrently a longitudinal and a lateral reciprocation.

4. An improved cutting and polishing machine of the type described comprising in combination a frame, a bracket vertically slidable thereon between an idle lower and a working upper position, a vertical work-supporting spindle rotatable in said bracket, an electric motor in said bracket and transmission means for rotating said spindle from said motor, means comprising a rack in said bracket rigid with said spindle for vertical but not for rotational movement and a pinion in said frame meshing with said rack for manually vertically reciprocating said bracket, a movable tool-carrying means on said frame with a band-like abrasive tool thereon and a backing die for said band, means for moving said movable means between an active and an inactive position on said frame with respect to said work-carrying means, means for imparting to said abrasive band concurrently a longitudinal and a lateral reciprocation and spring means in said bracket for applying said workpiece into abrasive engagement with said band against said backing die under a desired pressure and adjusting means for varying said pressure.

5. An improved cutting and polishing machine of the type described comprising in combination a frame, a bracket vertically slidable on said frame between a lower idle and an upper working position, a vertical work-supporting spindle rotatably mounted in said bracket, an electric motor in said bracket and transmission means for rotating said spindle from said motor, means comprising a finger on said spindle and co-operating fixed means in said bracket for immobilizing said spindle against rotation when so desired, means comprising a rack in said bracket rigid with said spindle for vertical but not for rotational movement and a pinion in said frame meshing with said rack for manually vertically reciprocating said bracket, a movable tool-carrying means on said frame with a band-like abrasive tool thereon, and a backing die for said band, means for moving said movable means between an active and an inactive position on said frame with respect to said work-carrying means and means for imparting to said band concurrently a longitudinal and a lateral reciprocation.

6. An improved cutting and polishing machine of the type described particularly adapted for the working of toric surfaces, comprising in combination a frame, a bracket vertically slidable thereon between an idle lower and a working upper position, a horizontally-extending work-supporting spindle rotatable in said bracket, an electric motor in said bracket and transmission means to rotate said spindle from said motor, means including a rack-and-pinion gearing for manually reciprocating said bracket between said two positions thereof, a movable tool-carrying means on said frame with a band-like abrasive tool thereon and a working die for said band, the plane of symmetry of said band-like tool being generally parallel with the axis of said spindle, means for moving said movable means between an active and an inactive position on said frame with respect to said work-supporting means and means for imparting to said abrasive band concurrently a longitudinal and a lateral reciprocation.

7. An improved cutting and polishing machine of the type described comprising in combination a frame, a bracket vertically slidable thereon between a lower idle and an upper working position, a work-supporting spindle rotatable in said bracket, an electric motor in said bracket and transmission means for rotating said spindle from said motor, means comprising a rack-and-pinion gearing to manually vertically reciprocate said bracket between said positions thereof, a carriage slidable on said frame between an active and an inactive position with respect to a work-piece on said spindle, means to displace said carriage between said two positions thereof, a movable tool-carrying poppet slidable on said carriage, a pair of laterally spaced drum members with parallel horizontal axes on said tool-carrying means adapted to be rocked about said axes, a band-like abrasive tool at each end secured to said drums to be longitudinally reciprocated by said rocking movement thereof, in abrasive engagement with said work-piece on said spindle, a backing die means for said tool on said tool-carrying means, means for reciprocating said tool-carrying poppet with respect to said carriage to thereby impart a lateral reciprocation to said abrasive band and means for rocking said drums to thereby impart a longitudinal reciprocation to said band.

8. An improved cutting and polishing machine of the type described comprising in combination a frame, a bracket vertically slidable thereon between a lower idle and an upper working position, a work-supporting spindle rotatable in said bracket, an electric motor in said bracket and transmission means for rotating said spindle from said motor, means comprising a rack-and-pinion gearing for thus manually vertically reciprocating said bracket between said positions thereof, a carriage movable on said frame between an active and an inactive position with respect to a work-piece on said spindle, a movable tool-carrying slide-block reciprocable on said carriage, a pair of laterally-spaced drums with parallel horizontal axes on said slide-block adapted to be rocked about said axes thereof, a band-like abrasive tool at each end secured to said drums to be longitudinally reciprocated by said rocking movement thereof in abrasive engagement with said work-piece, stretcher rollers for said band at each side of said work-piece and adjusting means for vertically positioning said rollers, a backing means for said band on said slide-block, a second electric motor in said carriage, means including an eccentric of adjustable throw to reciprocate said slide-block from said motor, to thereby impart a lateral reciprocation to said band, and means for rocking said drums from said second motor to thereby impart a longitudinal reciprocation to said band.

SERGE CLAVÉ.
MARCEL CLAVÉ.

REFERENCES CITED

The following references are of record in the file of this patent:

UNITED STATES PATENTS

| Number | Name | Date |
|---|---|---|
| 1,630,775 | Arkema | May 31, 1927 |
| 1,675,183 | Loeffler | June 26, 1928 |
| 1,881,162 | Aurori et al. | Oct. 4, 1932 |
| 1,912,016 | Sittner | May 30, 1933 |
| 2,109,669 | Lippold | Feb. 22, 1938 |
| 2,258,733 | Brackett | Oct. 14, 1941 |
| 2,386,850 | Gaudreau | Oct. 16, 1945 |